Feb. 14, 1933. F. HIMMEL ET AL 1,897,476
CUSHION FOR MOUNTING SHEETS OF GLASS
Filed Jan. 7, 1932

Patented Feb. 14, 1933

1,897,476

UNITED STATES PATENT OFFICE

FRED HIMMEL AND ISIDORE HIMMEL, OF NEW HAVEN, CONNECTICUT, ASSIGNORS TO THE HIMMEL BROTHERS COMPANY, OF NEW HAVEN, CONNECTICUT, A CORPORATION

CUSHION FOR MOUNTING SHEETS OF GLASS

Application filed January 7, 1932. Serial No. 585,288.

This invention relates to an improvement in cushions for mounting sheets of glass. In various purposes such as store-front construction, shower-bath cabinets, and other places where sheets of glass are mounted, it is desirable to provide cushions between the supports for the glass. This has been accomplished by providing the supports with undercut grooves, and providing blocks of rubber or other suitable material, which are entered in said grooves on one or both sides of the glass as shown, for instance, in United States Patent No. 1,732,046, granted October 15, 1929, on our application.

The object of this invention is to increase the yielding possibilities of the cushions, and the invention consists in the construction as hereinafter described and particularly recited in the claims.

Figure 1:
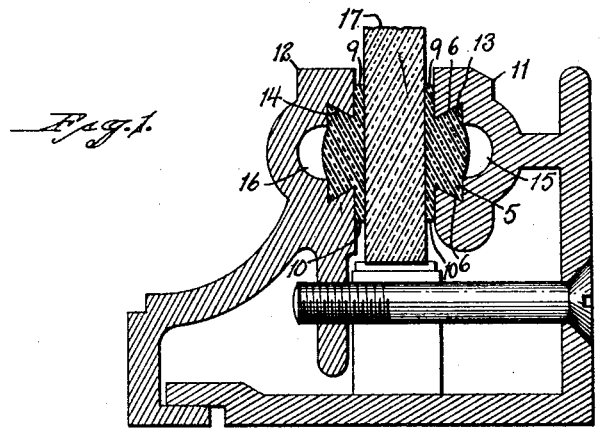
Fig. 1 is a sectional view showing our improved cushions for mounting sheets of glass and showing the cushions under pressure.
Figure 2:
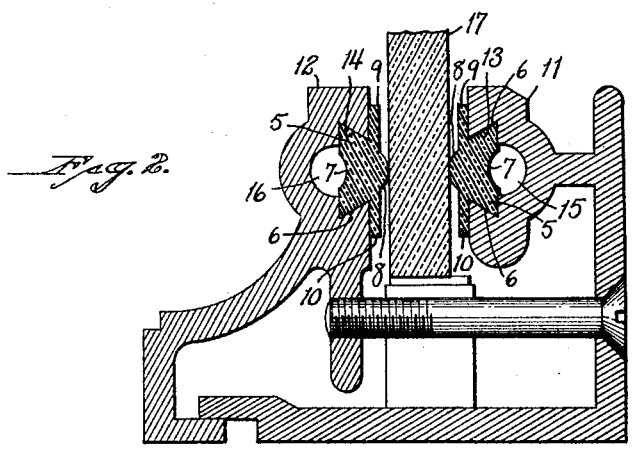
Fig. 2 is a similar view showing the cushions before pressure is applied.
Figure 3:
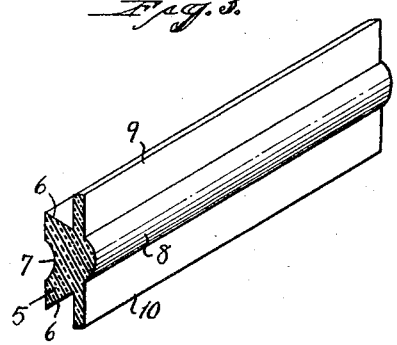
Fig. 3 is a perspective view of a strip of cushioning material, detached.

In carrying out our invention, we form the cushions from rubber or other suitable material, and comprising a block 5 having beveled edges 6, one face of the block formed with a transverse groove 7 and the opposite face with a transverse rib 8. The strips are also formed with fins 9 and 10.

These packing strips are mounted in the adjacent faces of construction-members 11 and 12, which are respectively provided with undercut grooves 13 and 14, and also with clearance-spaces 15 and 16, the ribs 8 extending toward each other so as to contact with opposite faces of a sheet 17 of glass.

As the construction members are drawn together and pressure is thereby applied to the ribs 8, these ribs will tend to collapse and the grooves 7 are provided for this displacement so that when the construction-members are drawn tightly together, the ribs 8 will be so compressed that the fins 9 and 10 contact with the sheets of glass although in case of variation in the thickness of the glass, the ribs are in position to exert a supporting function.

We claim:

1. A cushion for sheets of glass comprising fins, a wedge-shaped block on one side of the fins and a longitudinally-arranged rib on the opposite side.

2. The combination with a glass-supporting member formed with an undercut channel, and a groove in said channel, of a cushion comprising fins, a dovetailed block on one side of the fins adapted to enter said undercut groove and formed with longitudinal grooves, the other sides of the fins formed with a longitudinal rib, whereby under pressure, the ribs may be displaced.

In testimony whereof, we have signed this specification.

FRED HIMMEL.
ISIDORE HIMMEL.